United States Patent
Garces et al.

(10) Patent No.: US 6,445,688 B1
(45) Date of Patent: Sep. 3, 2002

(54) METHOD AND APPARATUS FOR SELECTING A DIRECTIONAL ANTENNA IN A WIRELESS COMMUNICATION SYSTEM

(75) Inventors: Rodrigo Garces, Santa Cruz; Padmasheela Rayala; Hojat Khelghati, both of San Jose, all of CA (US)

(73) Assignee: Ricochet Networks, Inc., Denver, CO (US)

( * ) Notice: Subject to any disclaimer, the term of this patent is extended or adjusted under 35 U.S.C. 154(b) by 215 days.

(21) Appl. No.: 09/652,858

(22) Filed: Aug. 31, 2000

(51) Int. Cl.$^7$ .............................. H04Q 7/00; H04Q 7/24
(52) U.S. Cl. .................... 370/334; 370/338; 370/465
(58) Field of Search ........................ 370/328, 329, 370/331, 332, 333, 334, 338, 339, 401, 465; 342/367, 368, 417, 423, 437; 375/267, 299; 455/25, 67.1, 101, 102, 115

(56) References Cited

U.S. PATENT DOCUMENTS

| | | | | |
|---|---|---|---|---|
| 5,303,240 A | * | 4/1994 | Borras et al. ............... | 342/368 |
| 5,369,801 A | | 11/1994 | Smith | |
| 5,410,738 A | * | 4/1995 | Diepstraten et al. ........ | 370/338 |
| 5,479,400 A | | 12/1995 | Dilworth et al. .............. | 370/60 |
| 5,617,102 A | * | 4/1997 | Prater ......................... | 342/374 |
| 5,936,949 A | * | 8/1999 | Pasternak et al. ........ | 370/310.1 |
| 5,966,094 A | | 10/1999 | Ward et al. | |
| 6,002,672 A | | 12/1999 | Todd | |

* cited by examiner

Primary Examiner—Ricky Ngo
(74) Attorney, Agent, or Firm—Townsend and Townsend and Crew, LLP (57) ABSTRACT

A method and a system are provided to determine and thus select the best choice for antenna to be used by a network device having a plurality of directional antennas for a particular sending source. The determination is made using on a metric based on the success rate of packets received at a particular directional antenna from the sending source and secondarily on a received signal strength indicator. The determination is stored and made available for processing such that a router is able to request communication through a device with a destination via the second wireless communication device without knowledge of the best antenna match. In a specific method the first communication device broadcasts packets, via each associated directional antenna, to query for the existence of the second wireless communication devices. The first device then receives a plurality of information packets about existence of the second wireless communication devices in response to the broadcast packets or in response to a query about third parties. As between each directional antenna and each second wireless communication device, a packet success metric is determined for each directional antenna, which becomes the basis for antenna selection.

16 Claims, 4 Drawing Sheets

METHOD AND APPARATUS FOR SELECTING A DIRECTIONAL ANTENNA IN A WIRELESS COMMUNICATION SYSTEM

BACKGROUND OF THE INVENTION

This invention relates generally to microcellular packet communication systems, and in particular to techniques for selecting a directional antenna of a plurality of directional antennas in a microcellar network device.

As personal wireless communication systems such as in cellular telephony proliferate, the spectrum available to the wireless user for accessing cell sites for interactive communication becomes premium. There is great pressure to shrink the cell size of cellular telephone systems, for example, in order to promote frequency reuse and ultimately increase user density and capacity, as well as to reduce the required transmitter power for battery-operated portables. This is part of the trend toward so-called microcellular systems.

An example of a microcellular system is described in U.S. Pat. No. 5,479,400, Robert P. Dilworth, et. al., entitled "Transceiver Sharing Between Access and Backhaul in a Wireless Digital Communication System," issued Dec. 26, 1995, which is incorporated herein by reference. A network device in such a microcellar system may use an omni-directional or directional antennas. Using directional antennas on a remote network device that may be mounted on an elevated structure, for example a poletop, has the advantage of favoring signals in the selected direction and suppressing or rejecting other signals. To take advantage of the use of directional antennas, there is a need for a technique that selects the best antenna for a particular signal source.

SUMMARY OF THE INVENTION

According to the invention a method and a system are provided to determine and thus select the best choice for antenna to be used by a network device having a plurality of directional antennas for a particular sending source. The determination is made using on a metric based on the success rate of packets received at a particular directional antenna from the sending source and secondarily on a received signal strength indicator. The determination is stored and made available for processing such that a router is able to request communication through a device with a destination via the second wireless communication device without knowledge of the best antenna match.

An embodiment according to the invention provides a communication system having a plurality of directional antennas associated with a first communication device at a first site, a router for targeting a destination via an indeterminate path including the first site, at least one second wireless communication device at a second site, a method for selecting a best antenna from the plurality of directional antennas for the first wireless communication device for communicating with each second wireless communication device. The first communication device broadcasts packets, via each of the directional antennas, to query for the existence of the second wireless communication devices. The first device then receives a plurality of information packets about existence of the second wireless communication devices in response to the broadcast packets or in response to a query about third parties. Thereafter, as between each directional antenna and each second wireless communication device, a packet success metric is determined for each directional antenna. The packet success metrics are compared with each other to determine a best match of directional antenna with each second wireless communication device. The best match is stored at the first device such that the router is able to request communication through the first device with the destination via the second wireless communication device without knowledge of the best match. In the comparison, if there are two or more possible largest packet success numbers, then selecting the best number as the possible packet success is based on the largest number with a best Received Signal Strength Indication (RSSI) value.

Another embodiment provides a method for selecting a best antenna from a plurality of directional antennas at a remote device for communicating with a wireless access device at a wired access point having a plurality of wireless access devices, where the remote device and the wireless access device belong to a path determined by a router. Next a plurality of synchronization packets is sent and a response received from the wireless access device at the wired access point to determine the presence of wireless access devices at the wired access point. If a memory of the remote device includes a stored RSSI associated with the wireless access device, the remote device obtains a new RSSI associated with the wireless access device. The remote device compares the stored RSSI with the new RSSI to determine if the stored best antenna value is the best antenna for the wireless access device, where the determination is made independently of the router.

In an embodiment a system for selecting the best antenna at a remote device of a plurality of remote devices for communicating with a wireless access device of a wired access point of a plurality of wireless access devices is provided. Each wireless access device includes a wireless communication link for communication to the remote device and a wired communication link to a wired network. The system includes: means for sending a plurality of information packets from the wireless access device to the remote device; the remote device, comprising a processor, a memory, and a plurality of directional antennas for receiving the plurality of information packets, where the memory has stored software having: a signal quality evaluation module for determining a first quality metric for each directional antenna from the information packets received for that antenna; and an antenna selection module for selecting, based on the first quality metric, the best antenna for the wireless access device.

A further understanding of the nature and advantages of the inventions herein may be realized by reference to the remaining portions of the specification and the attached drawings.

DESCRIPTION OF SPECIFIC EMBODIMENTS

Figure 1:
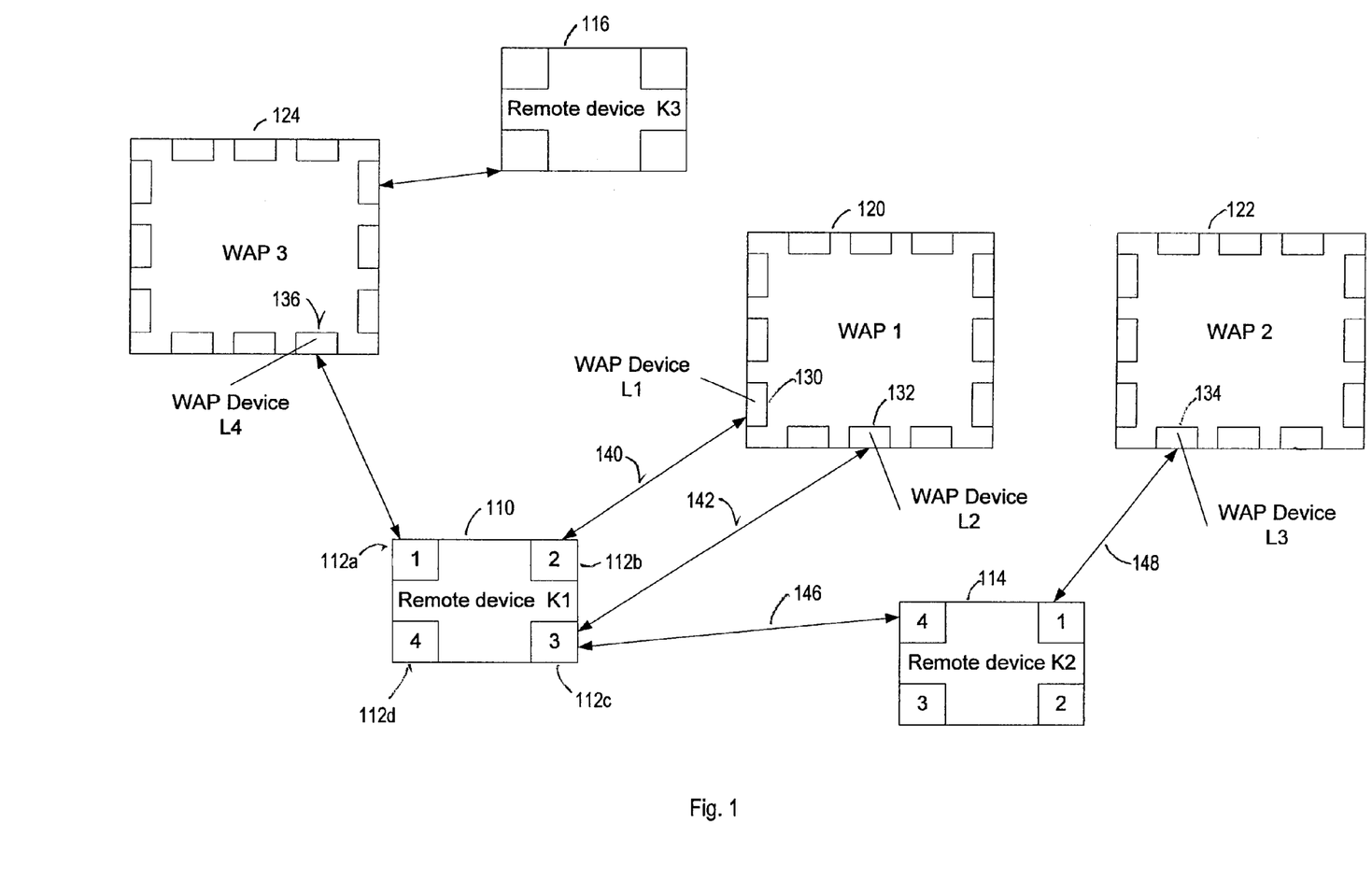
FIG. 1 shows a microcellar system including a plurality of connected network devices of an embodiment of the present invention.

FIG. 1 shows a microcellar system including a plurality of connected network devices of an embodiment of the present invention. There are two types of network devices: first, a remote network device (herein referred to as a remote device) which is a wireless communications device with N directional antennas. For example in FIG. 1, remote devices are K1 110, K2 114, and K3 116. N is an integer and is, for example, equal to four (N=4). With N=4, each directional antenna, for example, 112a, 112b, 112c, 112d of remote device K1 110, covers a quadrant of the remote device 110. The remote device may be located, for example, on the top of a light, electric, or telephone pole. And second, a Wired Access Point (WAP) network device (herein referred to as WAP device or wireless access device), which is a wireless communications device that is connected to a wired network and is located at a WAP. For example, WAP 1 120, WAP 2 122, and WAP 3 124 are three wired access point locations each having 12 WAP devices (3 WAP devices per side). For example WAP 1 120 includes WAP device L1 130 and WAP device L2 132, WAP 2 122 includes WAP device L3 134, and WAP 3 124 includes WAP device L4 136. FIG. 1 shows that remote device K1 110 is connected to WAP 1 120 through two communication links 140 (antenna 112b to WAP device L1 130) and 142 (antenna 112c to WAP device L2 132. Remote device K1 110 is connected to WAP 3 124 via WAP device L4 136. Remote device K1 110 communicates with remote device K2 114 over link 146, which in turn communicates with WAP Device L3 134 over link 148. Thus WAP Device L3 134 is a third party WAP device to remote device K1 110. Depending on the circumstances, remote device K1 110 may be able to communicate directly with this third party device.

In an embodiment a remote device, for example, remote device K1, acquires all the WAP devices it can on each of the four directional antennas, 112a, 112b, 112c, 112d, on the 2.4 GHz band. An evaluation process is then performed at the remote device for all acquired WAP devices for each antenna. The best antenna for each WAP device is selected. For example, the best antenna for WAP device L1 13 may be antenna 112b. The best antenna for each WAP device is stored in local volatile memory and may also be stored in the flash memory of the remote device. Thus the antenna selection process is in two parts: an acquisition process followed by an evaluation process.

In an embodiment the router selects the path between a source and destination which may include the remote device and a WAP device. The remote device selects the best directional antenna to communicate with the WAP device, independently of the router. Thus path selection and remote device antenna selection occur independently of each other.

In one embodiment, when the remote device is powered up, it begins the acquisition process to acquire all network devices (remote and WAP) in its vicinity. The remote device transmits a burst of sync packets using substantially a two-level FSK modulation, and then listens for responses. The remote device performs the acquisition process on all N directional antennas. For N=4 in an embodiment, the acquisition process takes 180 seconds per antenna, for a total of 720 seconds acquisition. On each antenna, on average the remote device sends 675 sync packets. There is a burst of 45 sync packets followed by a 8 to 16 second delay. This is repeated until the 180 seconds time period is completed, upon which the remote device moves to the next antenna. In the 8 to 16 second delay following the sync packet burst, the remote device listens for sync responses and also does third party queries. If either a sync response or third party response indicates a WAP device, then the Received Signal Strength Indicator (RSSI) is measured and indexed to this antenna and this WAP device. This RSSI is the acquisition RSSI or $RSSI_{NewAcq}$.

In an embodiment the RSSI is a measure of the strength of the received signal and is determined by a digital signal processor (DSP) chip, such as Texas Instruments Incorporated TMS320VC549, in the network device. The DSP chip calculates the power at the analog to digital converter and subtracts the gain at the receiver. The RSSI is measured continuously by the DSP and a moving average is kept. For example $RSSI_{NewAcq}$ for a particular WAP device and antenna is the received signal power of the sync response from the WAP device.

Figure 2:
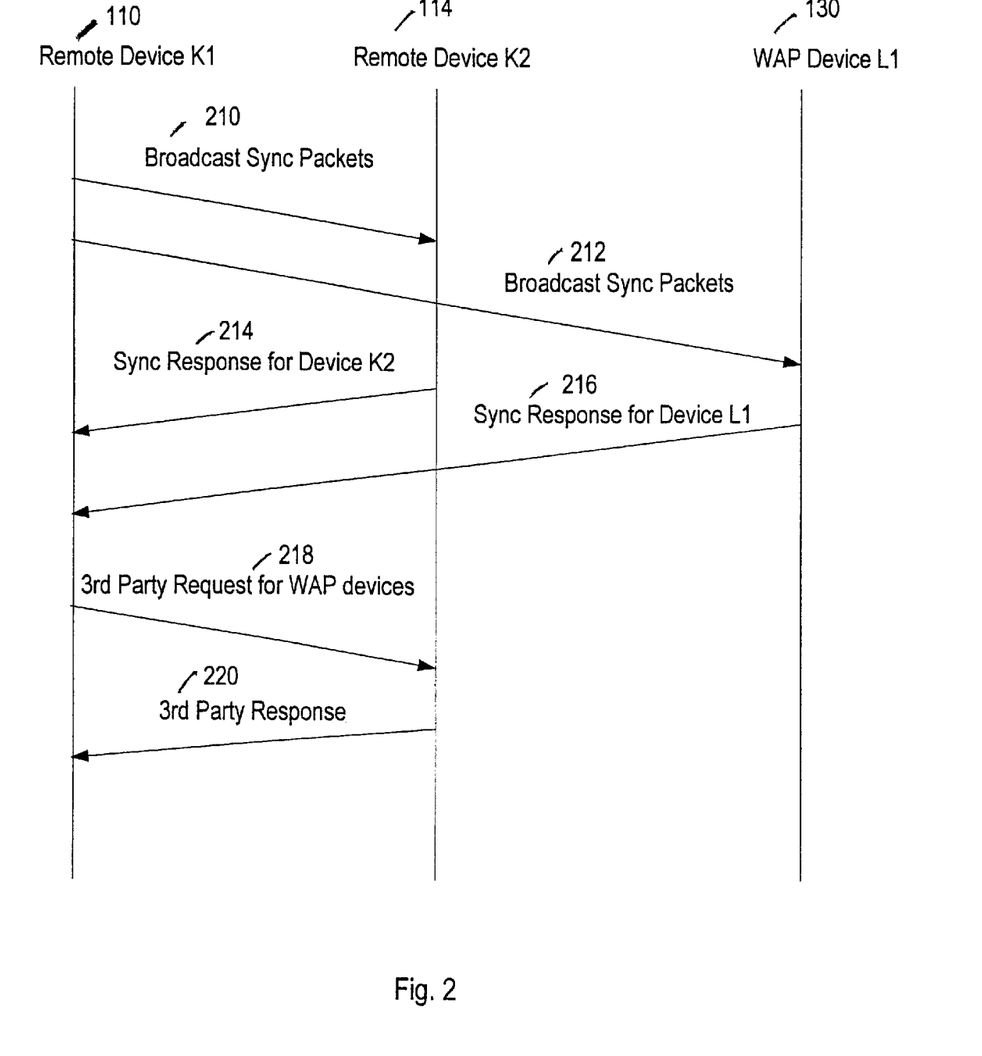
FIG. 2 shows an example of the acquisition process for one embodiment of the present invention.

FIG. 2 shows an example of the acquisition process for one embodiment of the present invention. Remote device K1 110 broadcasts a batch of synchronization, i.e., sync, packets 210 and 212 to remote device K2 114 and WAP device L1 130. Remote device K2 114 sends a sync response 214 back to remote device K1 110 indicating that remote device K2 114 can transmit packets to remote device K1 110. WAP device L1 130 after receipt of a broadcast sync packet 212 from remote device K1 110 sends back a sync response 216 indicating WAP device L1 130 can send information to remote device K1 110. Remote device K1 110 then sends a third party request 218 to remote device K2 114, requesting all WAP devices remote device K2 communicates with. Remote device K2 114, as shown in FIG. 1, communicates with WAP device L3 134 on link 148. Remote device K2 114 sends back to remote device K1 110 a third party response 220 including WAP device L3 134 as a third party device. The RSSI's are measured for each antenna for WAP Device L4 135, WAP Device L1 130, WAP Device L2 132, and WAP Device L3 134.

In a specific embodiment the sync packet includes a plurality of information bytes. For example, the sync packet includes the sender's MAC address, the duration of the sender's slot in milliseconds, the sender's channel mask, the sender's seed, some transmit/receive delay information, and base modulation type. Thus when the remote device broadcasts the sync packets, it is informing any device that receives the packets of the remote device's hopping sequence via channel mask, seed, and time delay information The sync response packet has similar information as the sync packet.

After the acquisition process is completed for the remote device, the evaluation process is performed to determine the best remote device antenna for each antenna, for example, each of the four antennas (112a, 112b, 112c, 112d) of remote device K1 110. The Channel Quality Measurement (CQM), is used to accomplish this task. The CQM session is initiated by the remote device requesting from the WAP device, that the WAP device transmits M1 CQM packets in equally spread channels. For example, the remote device K1 110 may send one packet in M1=28 equally spread channels over the 260 channels in 2.4 GHz band (22, 30, 38, . . . , 222, 230, 238) using Pi/4 DQPSK modulation. A retry mechanism has been implemented within CQM module. The RSSI is measured for each of the channels a CQM packet is received on, i.e., $RSSI_{CQM}(i)$, where i is an index representing the channel (i=1 to M1 for the M1 channels).

The CQM packet includes header, data field, and a cyclic redundancy code (CRC) for error detection. The data field may have one or more bytes that are set by default to all ones. If the CRC detects an error on the received CQM packet then that packet is considered unsuccessfully received. The packet success rate (PSR) is the percentage of CQM packets successfully received, i.e., no CRC detected error, out of the M1 CQM packets sent by the WAP device.

Figure 3:
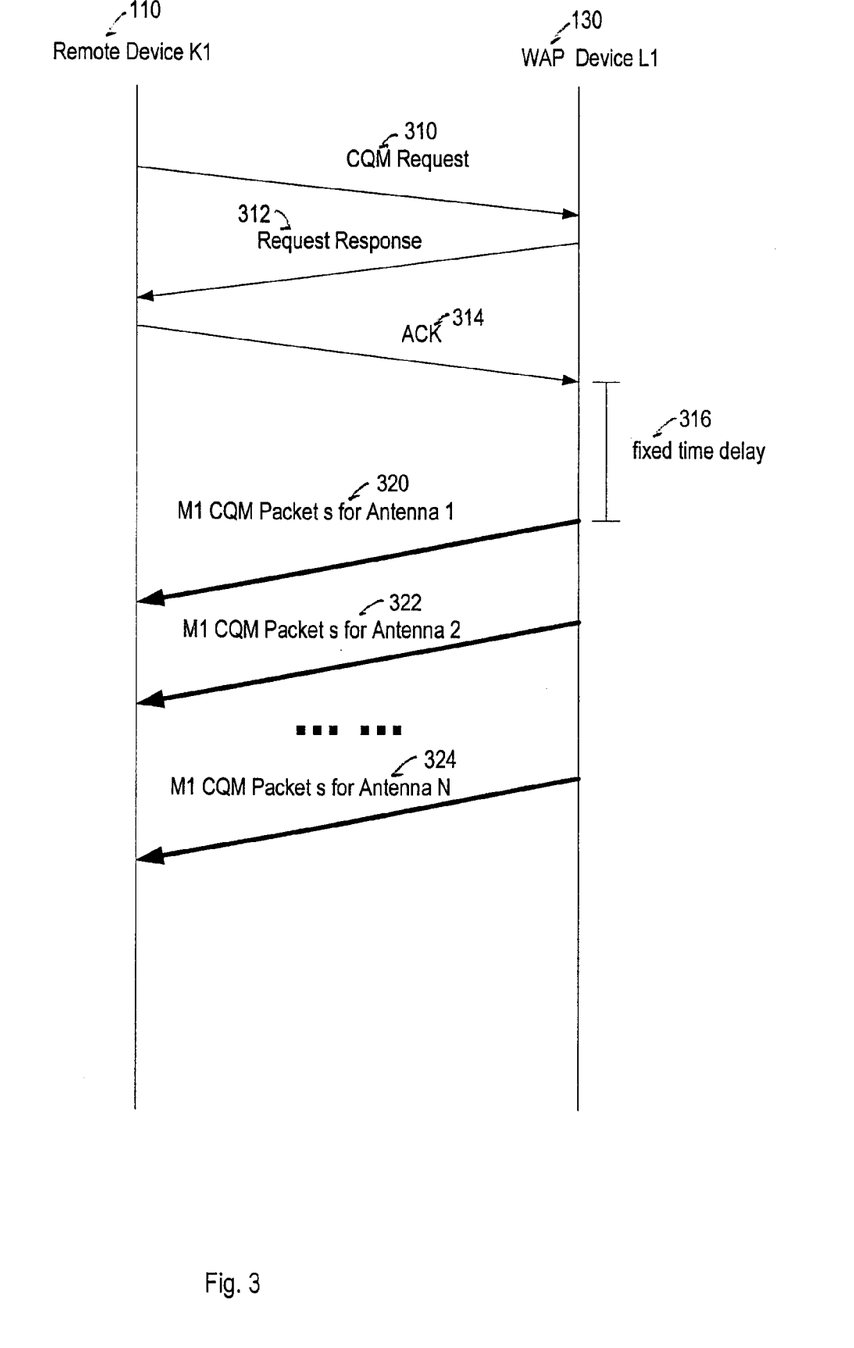
FIG. 3 illustrates an example of the CQM request and receipt process.

FIG. 3 illustrates an example of the CQM request and receipt process. A remote device K1 110 sends a CQM request 310 to WAP device L1 130, which was determined in the acquisition process above. WAP device L1 130 returns a request response 312 indicating device L1 130 can send a series of CQM packets to device K1 110. Remote device K1 110 then acknowledges 314 the return message 312. A fixed time delay 316 occurs, after which WAP device L1 130 starts sending M1 CQM packets 320 to antenna 1 112a of remote device K1 110. In this example, M1=28 and N=4. Thus WAP device L1 130 send one CQM packet in each of the 28 equally spaced frequency hopping channels to remote device K1. Next WAP device L1 130 sends 28 CQM packets 322 to antenna 2 122b of remote device K1 110. This is repeated up to and including 28 CQM packets 324 for antenna N. For remote device K1 of FIG. 1, the above CQM process, i.e., FIG. 3, is repeated for the remaining WAP devices, for example, WAP device L2 132, WAP device L3 134, and WAP device L4 136.

Figure 4:
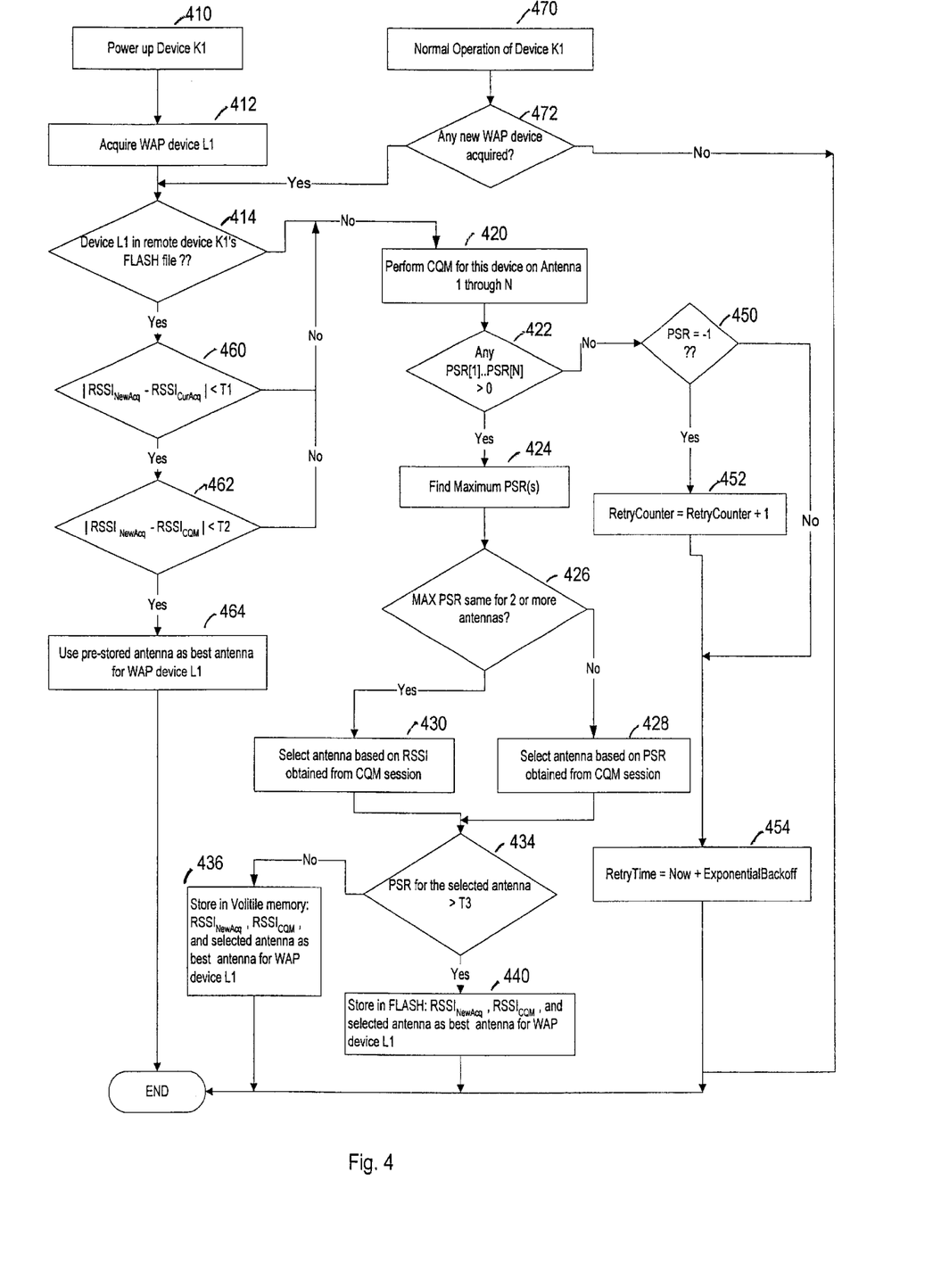
FIG. 4 illustrates a flowchart of the evaluation process of an embodiment of the present invention.

FIG. 4 illustrates a flowchart of the evaluation process of an embodiment of the present invention. At step 410 remote device K1 110 is powered up. At step 412 WAP device L1 130 is identified during the acquisition stage as explained in FIG. 2 above. Device K 110 checks if the WAP device L1 130 is in K1's flash file (step 414). If not, then at step 420 the CQM process as depicted in FIG. 3 above is performed on antennas 1 through and N of remote device K2 110. The CQM packet success rate (PSR) measured for each CQM channel for each antenna and an average $RSSI_{CQM}$, i.e., ave. $RSSI_{CQM}$, determined for each antenna. At step 422 if any of the N PSR's is greater than zero, then the maximum PSR is determined (step 424). At step 426, if there is only one antenna with the maximum PSR. value, then the selected antenna is the antenna with the largest PSR (step 428). If there are two or more antennas with the same maximum PSR, then the selected antenna is the antenna with the lowest $RSSI_{CQM}$ (step 430). At step 434, if the PSR for the selected antenna is determined to be above a threshold T3, for example, T3=80 percent, then the ave. $RSSI_{CQM}$ for each antenna, and the best antenna, i.e., selected antenna for WAP device L1 is stored in remote device K1's flash memory (step 440). In addition the $RSSI_{NewAcq}$ for each antenna, replaces the current $RSSI_{CurAcq}$ measurement (step 440). Table 1 gives an example of the contents of remote device K1's flash memory.

TABLE 1

| | | Flash Memory | |
|---|---|---|---|
| MAC Address | $RSSI_{CurAcq}$ | ave. $RSSI_{CQM}$ | Best Antenna |
| 019e | {623 000 000 000} | {0064 0064 0046 0051} | (4) |
| 00be | {856 808 000 000} | {0000 0081 −001 −001} | (2) |
| 00bd | {794 000 760 000} | {0083 0000 0071 0072} | (4) |
| 0266 | {844 808 000 000} | {0000 0000 0000 0066} | (8) |
| 00b8 | {698 000 574 593} | {0070 0076 0054 0057} | (4) |
| 0000 | {000 000 000 000} | {0000 0000 0000 0000} | (0) |
| 0000 | {000 000 000 000} | {0000 0000 0000 0000} | (0) |
| 0000 | {000 000 000 000} | {0000 0000 0000 0000} | (0) |
| 0000 | {000 000 000 000} | {0000 0000 0000 0000} | (0) | where, column 1 displays the last 4 digits of MAC address of each WAP device that remote device K1 can receive from; column 2 displays the current RSSI measurement obtained during the acquisition phase for each antenna; column 3 displays the average CQM RSSI obtained during the CQM session for each antenna; and column 4 indicates best antenna selected for the WAP device with the Machine Address Code (MAC) address in column 1. Column 4 uses a bit position to indicate which antenna of the four antennas for remote device K1 is selected, for example, antenna 1 is "0001," 2 is "0010," 3 is "0100," (binary 4) and 4 is "1000," (binary 8). If the PSR for the selected antenna is not greater than T3 (step 434), then at step 436 for each WAP device ,the $RSSI_{CQM}$, and $RSSI_{NewAcq}$ for each antenna, and the best antenna, i.e., selected antenna for this WAP device is stored in remote device K1's local (volatile) memory for use in determining the best antenna for each WAP device. device is stored in remote device K1's local (volatile) memory for use in determining the best antenna for each WAP device.

In another embodiment at step 430 of FIG. 4, if the least $RSSI_{CQM}$ is the same for two or more antennas, then the best antenna is selected on the least $RSSI_{NewAcq}$. If the least $RSSI_{NewAcq}$ is the same for two or more antennas, then the best antenna is selected at random from the antennas with the least $RSSI_{NewAcq}$.

In one specific embodiment the antenna evaluation process is given by the pseudocode below:

---

```
For each WAP device (1 through Num_WAP_device_during_acquisition_phase)
{
    If WAP device data is not available in the remote device flash file system
    and has not been evaluated yet, then:
    {
        For each Ant (1, 2, 3, 4)
        {
            WAP device sends 28 CQM packet of size 32 bytes on 28
```

```
            equally spread channels
            If CQM is successful
            {
                PSR [Ant] = 100 *
                [successful packets received]/[packets transmitted]
                RSSI_CQM[Ant] = average received CQM RSSI for
                Antenna Ant
            }
            Else if CQM session could not be established
            {
                PSR[Ant] = -1
            }
            Else if CQM session prematurely terminated
            {
                PSR[Ant] = 0
            }
            Else if WAP device was too busy to establish the CQM
            session
            {
                PSR[Ant] = -2
            }
        }
        If PSR is available for this E-radio
        {
            Select the best antenna with highest PSR. If PSR are same,
            RSSI is used as the tiebreaker.
        }
        Else
        }
        If PSR of the best Antenna is > 80%
        {
            Save to Flash File System
        }
    }
    Else
        {
            Use pre-stored antenna in Flash file system
        }
};
```

In one specific embodiment the remote device may fail to select the best antenna during evaluation, i.e., all PSR[Ant] are less than or equal to zero (step 450 of FIG. 4). This may occur, for example, because the WAP device was busy (PSR=-2), or the CQM session is improperly terminated (PSR=0), or the CQM session could not be started (PSR=-1). In these cases the remote device re-schedules another antenna evaluation to be done at a later time (retry_time, step 454). There are a maximum of 6 retries, i.e., the retry_counter is less than 7. The retry counter is incremented only when the remote device was not able to establish a CQM session to an WAP device ,i.e., PSR=-1 (steps 450 and 452). Otherwise the retry counter remains the same and another antenna evaluation is scheduled to be done at a later time, according to the retry_time. The following back-off algorithm is applied to determine when the next antenna evaluation should be initiated by the remote device:

retry_time=CurrentTime+(mrand ( ) % RetrySlotTable [retry_counter]+1)* 60000 where, RetrySlotTable is an array of integer of size 6 {2, 4, 8, 16, 32, 64}. For example if the retry_counter is one then the retry_time is the current time plus [0, 1, or 2]*60000 milliseconds.

In an embodiment data associated with WAP devices with PSR of greater than 80% are saved in the directional antenna flash file system within a remote device, for example, Table 1 above. All other data associated with WAP devices is stored in remote device K1's local (volatile) memory. To increase the efficiency of determining the best antenna for a particular WAP device, this stored data (flash and volatile) may be used under certain circumstances in place of performing the evaluation process (step 420 to 440). From FIG. 4, if at step 414 WAP device L1 130 MAC address is in remote device K1's flash memory, then first the absolute value of $RSSI_{NewAcq}$ minus $RSSI_{CurAcq}$ is tested to be less than a threshold T1 (step 460), for example T1=8 dBm. If yes then the RSSI during the acquisition phase has not changed substantially from the last measurement. Next the absolute value of $RSSI_{NewAcq}$ minus average $RSSI_{CQM}$ is tested to be less than a threshold T2 (step 462), for example T2=8 dBm. If yes then the RSSI between the CQM phase and the acquisition phase is similar. Thus the pre-stored best antenna in the flash for WAP device L1 is probably still the best antenna, and the (re-)evaluation process may be skipped (step 464). The pseudo code for one embodiment is given below:

```
If this WAP device exists in the remote device Flash File System
{
    For each Antenna (1, 2, 3, 4)
    {
        If ( RSSI_NewAcq not equal 0 and RSSI_CurAcq not equal 0 )
        {
            If abs(RSSI_NewAcq - RSSI_CurAcq) < 8 dBm
            {
```

```
        If abs(RSSI_NewAcq – ave. RSSI_CQM) < 8 dBm
        {
            Skip CQM session for this WAP device
            Use pre-stored antenna as the best antenna
            for this WAP device
        }
      }
    }
  }
}
```

In an embodiment after the power-up stage (steps 410 through 464) determines the best antennas for each WAP device that may communicate with remote device K1, a monitoring process is periodically performed (step 470), for example, once every 60 seconds. At step 472 the remote device checks for any newly acquired WAP devices. If yes then the evaluation process is performed (starting at step 414). If no, then the monitoring process goes back to sleep for another 60 seconds.

Although the above functionality has generally been described in terms of specific hardware and software, it would be recognized that the invention has a much broader range of applicability. For example, the software functionality can be further combined or even separated. Similarly, the hardware functionality can be further combined, or even separated. The software functionality can be implemented in terms of hardware or a combination of hardware and software. Similarly, the hardware functionality can be implemented in software or a combination of hardware and software. Any number of different combinations can occur depending upon the application.

The foregoing description of embodiments of the invention is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein and represented by the appended claims.

What is claimed is:

1. In a wireless communication system having a plurality of directional antennas associated with a first communication device at a first site, a router for targeting a destination via an indeterminate path including said first site, at least one second wireless communication device at a second site, a method for selecting a best antenna from said plurality of directional antennas for said first wireless communication device for communicating with each said second wireless communication device, the method comprising:

causing said first communication device to broadcast packets, via each said directional antenna, to query for existence of said second wireless communication devices;

receiving a plurality of information packets about existence of said second wireless communication devices in response to said broadcast packets or in response to a query about third parties; thereafter as between each said directional antenna and each second wireless communication device, determining a packet success metric for each said directional antenna;

comparing packet success metrics with each other to determine a best match of directional antenna with each second wireless communication device; and storing at said first site said best match such that said router is able to request communication through said first device with said destination via said second wireless communication device without knowledge of said match.

2. The method of claim 1 wherein the packet success metric is a Packet Success Rate (PSR).

3. The method of claim 1 further including exchanging a Channel Quality Measurement (CQM) packet between each said directional antenna and said second wireless communication devices for reporting channel quality.

4. The method of claim 1 wherein the plurality of directional antennas comprises four directional antennas oriented to have substantially 360 degrees horizontal antenna coverage.

5. The method of claim 3 wherein the comparing step further comprises:

if there is one possible largest packet success metric, selecting the largest packet success metric as the best metric; or if there is a plurality of identical possible largest packet success metrics, selecting as the best metric that metric associated with a best Received Signal Strength Indication (RSSI) value determined during a communication session involving said Channel Quality Measurement packets.

6. The method of claim 1 further comprising storing the best metric memory at said first communication device only when the best metric exceeds a threshold value.

7. A method for selecting a best antenna from a plurality of directional antennas at a remote device for communicating with a wireless access device at a wired access point having a plurality of wireless access devices, wherein the remote device and the wireless access device belong to a path determined by a router, the method comprising:

sending a plurality of synchronization packets and receiving a response from the wireless access device at the wired access point to determine the presence of wireless access devices at the wired access point;

if a memory of the remote device, includes a stored RSSI associated with the wireless access device, obtaining a new RSSI associated with the wireless access device; and comparing the stored RSSI with the new RSSI to determine if the stored best antenna is the best antenna for the wireless access device, wherein the determination being made independently of the router.

8. The method of claim 7 wherein the sending the plurality of synchronization packets is over a plurality of frequency hopping channels.

9. A system for selecting the best antenna at a remote device of a plurality of remote devices for communicating with a wireless access device of a wired access point of a plurality of wireless access devices, wherein each wireless access device comprises, a wireless communication link for communication to the remote device and a wired communication link to a wired network, the system comprising:

means for sending a plurality of information packets from the wireless access device to the remote device; and the remote device, comprising a processor, a memory, and a plurality of directional antennas for receiving the plurality of information packets, wherein the memory has stored software comprising:
- a signal quality evaluation module for determining a first quality metric for each said directional antenna from the information packets received for that antenna; and
- an antenna selection module for selecting, based on the first quality metric, the best antenna for the wireless access device.

10. The system of claim 9 wherein the sending includes using a plurality of frequency hopping channels.

11. The system of claim 9 further comprising:
a flash memory for storing the best directional antenna for communicating to the wireless access device, when the best quality metric associated with the best directional antenna is above a threshold value.

12. The system of claim 9 wherein the first quality metric includes a packet success rate.

13. The system of claim 9 wherein the signal quality evaluation module further includes a second quality metric for each directional antenna, said second quality metric based on a received signal strength indicator.

14. The system of claim 13 wherein the antenna selection module further employs the second quality metric.

15. The system of claim 9 wherein the stored software further comprises a retry module when the first quality metric cannot be determined.

16. In a wireless communication system having a plurality of directional antennas associated with a first communication device at a first site, a router for targeting a destination via an indeterminate path including said first site, at least one second wireless communication device at a second site, a computer program product for selecting a best antenna from said plurality of directional antennas for said first wireless communication device for communicating with each said second wireless communication device, the method comprising:
- code for causing said first communication device to broadcast packets, via each said directional antenna, to query for existence of said second wireless communication devices;
- code for receiving a plurality of information packets about existence of said second wireless communication devices in response to said broadcast packets or in response to a query about third parties; thereafter
- code for as between each said directional antenna and each second wireless communication device, determining a packet success metric for each said directional antenna;
- code for comparing packet success metrics with each other to determine a best match of directional antenna with each second wireless communication device;
- code for storing at said first site said best match such that said router is able to request communication through said first device with said destination via said second wireless communication device without knowledge of said match; and
- a computer readable storage medium for storing the codes.

* * * * *